Figure 1:
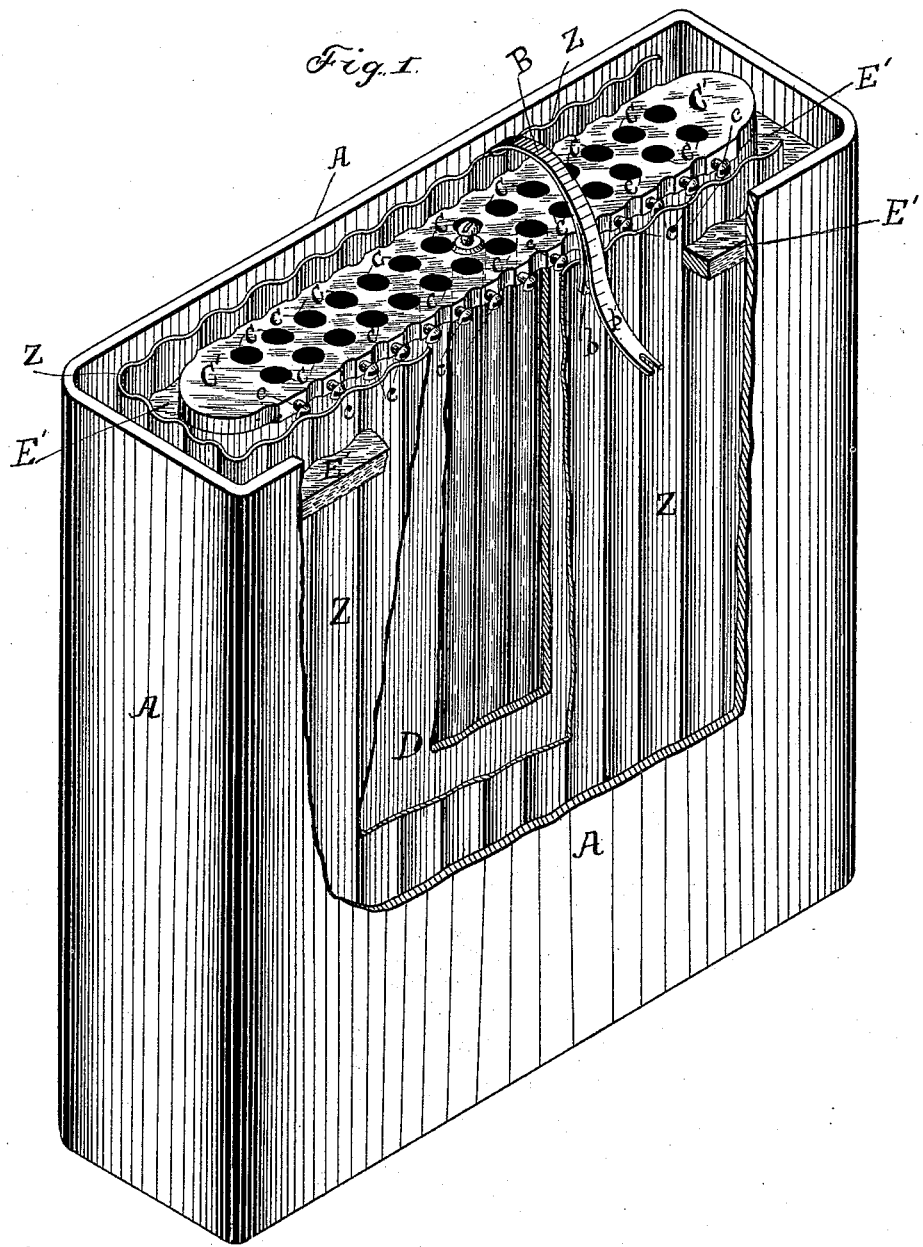

(No Model.) 2 Sheets—Sheet 1.

W. E. IRISH.
GALVANIC BATTERY.

No. 419,774. Patented Jan. 21, 1890.

Witnesses.
Inventor
William E. Irish,
By Joseph A. Osborn,
His Attorney.

(No Model.) 2 Sheets—Sheet 2.
W. E. IRISH.
GALVANIC BATTERY.
No. 419,774. Patented Jan. 21, 1890.
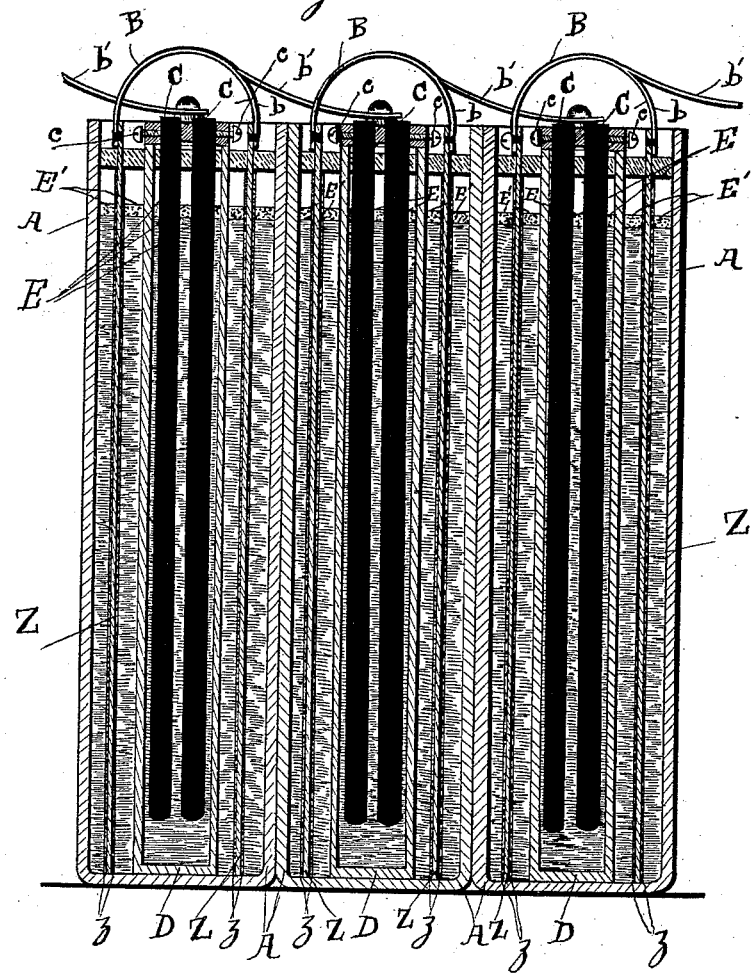

UNITED STATES PATENT OFFICE.

WILLIAM E. IRISH, OF CLEVELAND, OHIO, ASSIGNOR TO THE IRISH ELECTRIC COMPANY, OF SAME PLACE.

GALVANIC BATTERY.

SPECIFICATION forming part of Letters Patent No. 419,774, dated January 21, 1890.

Application filed July 18, 1889. Serial No. 317,847. (No model.)

*To all whom it may concern:*

Be it known that I, WILLIAM E. IRISH, a resident of Cleveland, in the county of Cuyahoga, State of Ohio, have invented certain new and useful Improvements in Galvanic Batteries; and I do hereby declare the following to be a full, clear, and exact description of my invention, such as will enable others skilled in the art to which it appertains to make and use the same.

My invention relates to galvanic-battery cells.

The objects of my invention are a comparatively constant current of electricity of high electro-motive force, low resistance, and large current, which can be maintained at small expense, avoiding the necessity of frequently renewing the battery solutions. To accomplish these objects my invention comprehends the use of solutions which are partially regenerated by chemical action in the cell, and which save rapid wasting of the positive element and prevent the formation of salt crystals on the electrodes.

My invention is fully described herein, and is specifically defined in the claims.

In the accompanying drawings, Figure 1 is a side elevation of the form of cell I prefer, part of the outer wall, the zinc electrode, and the porous pot being broken away to illustrate its construction and arrangement. Fig. 2 is a cross-section on a central vertical line through three of said cells joined in a simple series.

A is the outer cell of the battery, and is made of glass or any suitable material.

D is the inner cell, and is made of unglazed porous porcelain, terra-cotta, soft-burned and unglazed clay, or some other porous material not liable to be acted upon by the battery liquids.

Z is the positive electrode of amalgamated zinc, and C C are the negative or carbon electrodes.

C' is a plate for supporting the carbons C C, and c are screws for holding the carbons in their places in the plate C'.

B are connection-strips of suitable material.

E is a layer of paraffine-wax covering the fluid of the inner cell.

E' is a layer of oil covering the fluid of the outer cell.

The electrodes I preferably use are amalgamated zinc plates, either corrugated or flat, and carbons. The zinc electrode is amalgamated with mercury in the ordinary way, after which it is preferably further covered with an amalgam composed of tallow and mercury mixed in proportions which will make a thick paste $z$.

The arrangement of battery I prefer as being best adapted to my invention is illustrated in the drawings. The zinc electrode is placed within the outer cell and the carbon electrode is placed within the inner cell. The zinc electrode almost surrounds the porous pot. The carbon electrode shown in the drawings consists of a number of carbon rods held in place by a plate C', which fits on the top of the porous pot, said plate being bored to receive the upper ends of the carbon sticks C, which are secured by the set-screws $c$. Instead of employing rods of carbon for the negative electrode, a single large flat or corrugated carbon plate may be used. Wires may be used for the connection-strips B; but it is preferable to use such strips and have the same split, as shown, one end of B and one part of the strip $b$ being attached to the zinc electrode Z, while the other part $b'$ is attached to the carbon electrode C, as illustrated. Other forms of battery than that illustrated, however, may be successfully employed with my invention.

The solution in which the zinc electrode Z is immersed is composed of the following ingredients in approximately the proportions given:

| | |
|---|---|
| Sulphuric acid | .10 to .10 |
| Mecca-oil dissolved in the sulphuric acid before combining with the water | .02 to .03 |
| Sodium sulphate | .05 to .04 |
| Water | .83 to .83 |
| | 100   100 |

Instead of the sodium sulphate, however, any other sulphate of an alkaline metal may be used.

If it is desired to secure lower resistance than can be obtained by the solution given, I dispense with the sodium sulphate.

The solution in which the carbon electrode is immersed is composed of the following ingredients in approximately the proportions given: In a quantity of hot water, which will be from five to ten per centum of the whole compound, I dissolve as much bichromate of potash as the water will hold in solution. Then I add as much chlorate of potash and nitrate of soda in the saturated bichromate of potash as the same will dissolve. It may be here stated that many liquids having all it can hold in solution of any salt—such as bichromate of potash—will still dissolve and take up other salts almost as freely as before the addition of the first salt. After dissolving the chlorate of potash and nitrate of soda in the saturated bichromate of potash, I add of flour of sulphur and chromic acid each an amount equal to five to ten per cent. of the whole solution. Then to a fully-saturated solution of bichromate of potash in nitric acid I dissolve as much more chlorate of potash and nitrate of soda as the acid will hold in solution, and to this acid-salt solution is added from five to ten per cent. each of flour of sulphur and chromic acid. These solutions are then carefully mixed. For mixing these ingredients I use a vessel having a narrow neck and in which very little of the liquid is in contact with the air. This mixture is added to a portion of sulphuric acid in which there has been dissolved as much of the compound salts, minus the chlorate of potash—i. e., nitrate of soda, bichromate of potash, and five to ten per cent. each of chromic acid and flour of sulphur—as the acid will hold in solution, the quantity of sulphuric acid in which the compound salts is dissolved being governed by the work required of the battery. For instance, I find a one-third nitric-acid and two-thirds sulphuric-acid mixture a very satisfactory one; but where increased length of life is the desideratum the proportion of nitric acid may be increased with advantage. On the other hand, where the highest electro-motive force and very large current for a limited time at the lowest cost is the desideratum, sulphuric acid should be added proportionately.

From time to time as needed some of the prepared compound salts are added to the acid mixture and some of the sulphuric solution is replaced with fresh as it becomes too weak. The zinc electrode must at all times be kept well amalgamated.

The compound salts are prepared by grinding, dissolving, evaporating, and thoroughly incorporating with the reformed combined salts and flour of sulphur.

During the action of the cell the zinc is oxidized, and the oxide is transformed to a sulphate by the sulphuric acid. The free hydrogen released collects at the negative electrode, and, with a portion of the oxygen of the nitric acid, forms water. The reduced nitric acid or nitric oxide takes oxygen from the salts in the solution which has been decomposed by the sulphuric acid, and is again converted into nitric acid or is regenerated. The nitrate of soda in solution is transformed to a sulphate by the action of the sulphuric acid, and nitric acid is set free for use in the cell. The chlorine of the chlorate of potash decomposes the water, setting free oxygen, which, with the free oxygen of the decomposed salts, oxidize the sulphurous and nitrous acids, reconverting them, respectively, into nitric and sulphuric acid. The action of the sulphuric and sulphurous acids is to convert the nitrates into sulphates, releasing nitric acid, which gives up a considerable portion of its oxygen for use in the cell. The chlorate of potash is decomposed by the sulphuric acid and pure oxide of chlorine formed.

I put some of the undissolved compound salts and sulphates into the cell, where it becomes gradually dissolved as the concentration of the solution is lowered, the solution thus being maintained at a certain concentration and a uniform and constant current obtained.

The advantage of regenerating the nitric acid and maintaining it for a considerable time of about the same specific gravity is apparent to persons skilled in the art.

What I claim as my invention is—

1. In a voltaic-battery cell, a solution for the positive electrode consisting of sulphuric acid, mecca-oil, and a sulphate of an alkaline metal, substantially as specified.

2. In a voltaic-battery cell, a solution of sulphuric acid and mecca-oil, substantially as and for the purpose specified.

3. In a voltaic-battery cell, a solution of bichromate of potash, chlorate of potash, nitrate of soda, flour of sulphur, nitric acid, sulphuric acid, and chromic acid, substantially as specified.

4. In a voltaic-battery cell, in combination, a positive electrode immersed in a solution of sulphuric acid, mecca-oil, and a sulphate of an alkaline metal, and a negative electrode immersed in a solution of bichromate of potash, chlorate of potash, nitrate of soda, flour of sulphur, nitric acid, sulphuric acid, and chromic acid, substantially as specified.

5. In a voltaic-battery cell, in combination, a positive electrode immersed in a solution of sulphuric acid and mecca-oil, and a negative electrode immersed in a solution of bichromate of potash, chlorate of potash, nitrate of soda, flour of sulphur, nitric acid, sulphuric acid, and chromic acid, substantially as specified.

WILLIAM E. IRISH.

Witnesses:
JOSEPH A. OSBORNE,
WILLIAM J. WHITE.